R. E. WIBLE.
FRUIT PICKER.
APPLICATION FILED OCT. 7, 1913.
1,187,214.
Patented June 13, 1916.
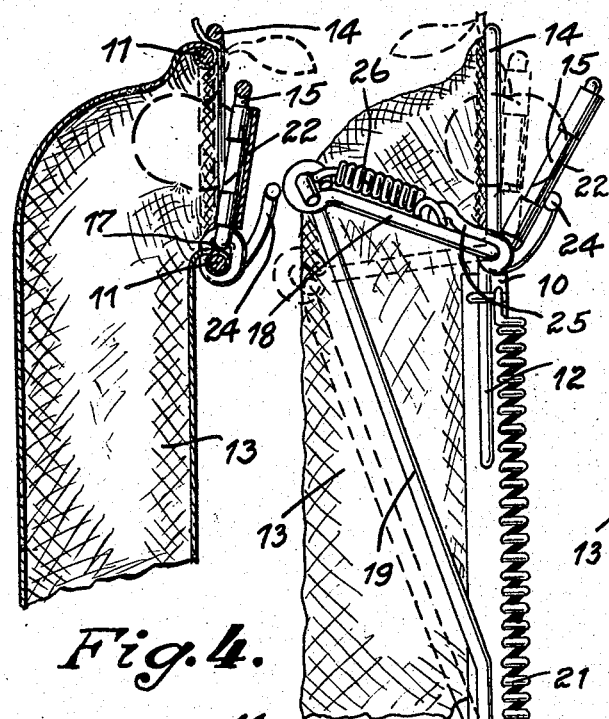
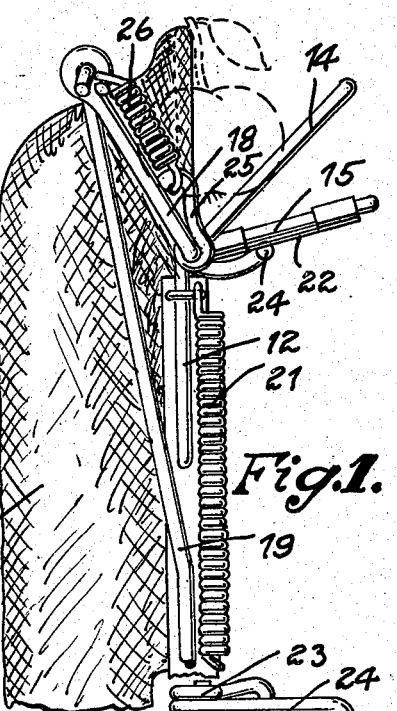
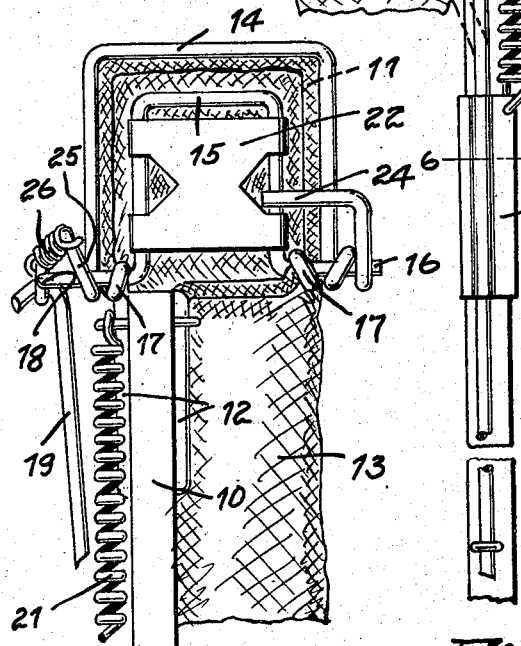
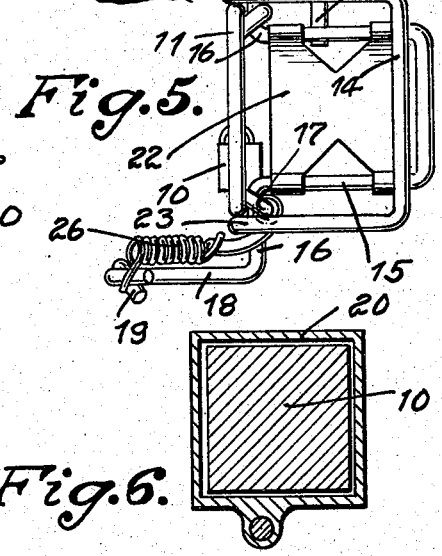
Fig. 4.  Fig. 1.  Fig. 5.  Fig. 3.  Fig. 2.  Fig. 6.
Witnesses
M. S. Watson
Francis Boyle
Inventor
R. E. Wible
By Chandler & Chandler
Attorneys

UNITED STATES PATENT OFFICE.

ROY E. WIBLE, OF KENDALLVILLE, INDIANA, ASSIGNOR TO C. D. DUFFIELD AND G. A. SCHUTT, BOTH OF KENDALLVILLE, INDIANA.

FRUIT-PICKER.

1,187,214. Specification of Letters Patent. Patented June 13, 1916.

Application filed October 7, 1913. Serial No. 793,898.

*To all whom it may concern:*

Be it known that I, ROY E. WIBLE, a citizen of the United States, residing at Kendallville, in the county of Noble, State of Indiana, have invented certain new and useful Improvements in Fruit-Pickers; and I do hereby declare the following to be a full, clear, and exact description of the invention, such as will enable others skilled in the art to which it appertains to make and use the same.

This invention relates to fruit pickers and has for an object to provide a device of this character that will have improved means in the nature of a two-piece movable jaw each member of which will have such movement that the fruit will be positively detached from the branch without injury and without jerking the pole which usually results in shaking other fruit from the branch.

A further object of the invention is to provide a fruit picker which is extremely simple and inexpensive in construction, and will be formed of a few strong and durable parts that will not easily get out of order.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention: Figure 1 is a side elevation showing the device open. Fig. 2 is a similar view showing the movable jaw with its clamping portion closed and follower portion in initial closing position, and also showing in dotted lines the follower portion closed. Fig. 3 is a front elevation of the device with the jaws closed. Fig. 4 is a longitudinal sectional view through the device with the jaws closed. Fig. 5 is a plan view of the device showing the jaws open and with the fabric chute removed. Fig. 6 is a cross sectional view on the line 6—6 Fig. 2.

Referring now to the drawing in which like characters of reference designate similar parts, 10 designates a pole, to the upper end of which there is attached a substantially square fixed jaw 11 formed from a single length of wire, the wire being bent downward at one corner as shown at 12 to provide attaching legs which are secured to the pole 10. There is a fabric chute 13 secured at the mouth to the jaw, the chute extending downward along the pole as usual.

The movable jaw comprises a clamping portion 14 and a follower portion 15, both of these portions initially moving together until the clamping portion binds the fruit within the fixed jaw, the follower portion then moving up within the inclosure of the clamping portion and dislodging the fruit and at the same time forcing the same into the chute. In constructing these parts, the follower portion is formed of a single length of wire bent substantially U-shaped with the terminals directed outwardly as shown at 16 and journaled in eyes 17 formed at the lower corners of the stationary jaw, one of the terminals being directed upwardly and forming a crank 18 to which is attached a pull rod 19 that extends downwardly along the pole and is terminally equipped with a sleeve 20 which slidably fits on the pole, there being a helical spring 21 attached to the sleeve and attached at the upper end to the pole to normally hold the follower portion open and extending at substantially a right angle to the fixed jaw. A plate 22 is connected at the edges to the sides of the follower and forms a closure the purpose of which will presently appear.

The clamping portion of the movable jaw is formed from a single length of wire bent U-shaped and provided at the terminals with hinge eyes 23 which encircle the gudgeons 16 of the follower portion, one of the terminals being directed to form a rectangular stop finger which engages across and underneath one side of the follower portion as shown at 24, while the other terminal is directed upwardly along the crank 18 as shown at 25 and is attached terminally to the crank by means of a helical spring 26. The finger 24 is depressed by the follower portion when the latter is opened by its controlling spring 21 with a resultant opening of the clamping portion to extend at an angle of about 45 degrees more or less from the open follower portion, while the spring 26 serves to hold the clamping portion in this position.

In operation the device is elevated until the fruit to be picked is disposed within the inclosures of and between the fixed jaw 11 and clamping portion 14 of the movable jaw. The pull rod 19 is now pulled down whereby the crank 18 is rocked down with a resultant rocking of the follower portion 15 of the movable jaw toward the fixed jaw, the clamping portion 14 of the movable jaw being simultaneously carried with the follower portion by means of its helical spring connection 26 with the crank. The clamping portion will eventually arrive at and conform to the contour of the fixed jaw whereby the stem of the fruit is clamped between the tops of both of these jaws with the fruit lying within the inclosure of the mouth of the chute. Upon continued downward movement of the pull rod the clamping action of the portion 14 will be gradually increased by tensioning of the spring 26 and the follower portion will be rocked into the inclosure of the fixed portion of the movable jaw as shown in dotted lines in Fig. 2 whereby the above mentioned closure plate 17 impinges against the fruit and dislodges the same from its stem and at the same time forces the latter into the chute. Upon the pull rod being released the parts of the movable jaw are immediately returned to normal position by their controlling springs.

It will thus be seen that with the above described device there is no necessity for jerking the pole downward after the fruit has been disposed within the open mouth of the sack, and that the picking of the fruit will be accomplished without shock or jar to the branch so that the other fruit on the branch is not shaken off. It will further be seen that I have provided an extremely simple, durable and inexpensive fruit picker which will be formed of a few parts that will not easily get out of order.

What is claimed, is:—

In a fruit picker, a fixed jaw, a clamping jaw provided with a crank, a follower journaled in said fixed jaw and supporting said clamping jaw for movement toward and away therefrom, a crank formed on the follower, said follower being movable toward the fixed jaw simultaneously with the clamping jaw and independently of said clamping jaw upon engagement of the latter with the fixed jaw, and a spring operatively connecting the crank portions of the follower and clamping jaw for gradually increasing the clamping action of the latter during independent movement of the follower in the direction of the fixed jaw.

In testimony whereof, I affix my signature, in the presence of two witnesses.

ROY E. WIBLE.

Witnesses:
  RILEY E. SMITH,
  GEORGE W. SMITH.

Copies of this patent may be obtained for five cents each, by addressing the "Commissioner of Patents, Washington, D. C."